(12) United States Patent
Sharma

(10) Patent No.: US 9,717,008 B1
(45) Date of Patent: Jul. 25, 2017

(54) INTEGRATED CIRCUIT CALIBRATION ARCHITECTURE

(71) Applicant: Peregrine Semiconductor Corporation, San Diego, CA (US)

(72) Inventor: Vikas Sharma, Reading (GB)

(73) Assignee: Peregrine Semiconductor Corporation, San Diego, CA (US)

(*) Notice: Subject to any disclaimer, the term of this patent is extended or adjusted under 35 U.S.C. 154(b) by 0 days.

(21) Appl. No.: 15/195,379

(22) Filed: Jun. 28, 2016

(51) Int. Cl.
   H04B 17/00 (2015.01)
   H04W 24/06 (2009.01)
   H04B 17/11 (2015.01)

(52) U.S. Cl.
   CPC ........... *H04W 24/06* (2013.01); *H04B 17/11* (2015.01)

(58) Field of Classification Search
   CPC ........ H04B 17/11; H04B 17/12; H04B 17/13; H04B 17/14; H04B 17/00; H04W 24/06
   See application file for complete search history.

(56) References Cited

U.S. PATENT DOCUMENTS

| | | | | |
|---|---|---|---|---|
| 6,208,287 | B1* | 3/2001 | Sikina | H01Q 3/267 342/174 |
| 7,187,916 | B2* | 3/2007 | Mo | H04B 1/30 375/346 |
| 7,423,586 | B2* | 9/2008 | Schieblich | H01Q 3/267 342/368 |
| 8,842,765 | B2* | 9/2014 | Kludt | H04B 7/043 375/259 |
| 2008/0285637 | A1* | 11/2008 | Liu | H04B 17/20 375/224 |
| 2010/0056083 | A1* | 3/2010 | Kim | H04B 17/21 455/115.1 |
| 2012/0020396 | A1* | 1/2012 | Hohne | H01Q 3/267 375/224 |
| 2013/0217343 | A1* | 8/2013 | Tenbroek | H04W 24/00 455/77 |
| 2016/0191177 | A1* | 6/2016 | Kim | H04B 17/13 375/224 |
| 2016/0197660 | A1* | 7/2016 | O'Keeffe | H01Q 1/246 370/329 |
| 2016/0254870 | A1* | 9/2016 | O'Keeffe | H01Q 21/24 455/67.14 |
| 2016/0344483 | A1* | 11/2016 | Kareisto | H04B 17/12 |

* cited by examiner

*Primary Examiner* — Blane Jackson
(74) *Attorney, Agent, or Firm* — Jaquez Land Greenhaus LLP; Martin J. Jaquez, Esq.; John L Land, Esq.

(57) ABSTRACT

A calibration architecture that enables accurate calibration of radio frequency (RF) integrated circuits (ICs) chips used in multi-transceiver RF systems in a relatively simple testing environment. Embodiments of the invention include one or more on-chip switchable cross-circuit calibration paths that enable direct coupling of a portion of the on-chip circuit to an RF test system while isolating other circuitry on the chip. Periodic self-calibration of an RF IC can be performed after initial factory calibration, so that adjustments in desired performance parameters can be made while such an IC is embedded within a final system, and/or to take into account component degradation due to age or other factors.

22 Claims, 6 Drawing Sheets

INTEGRATED CIRCUIT CALIBRATION ARCHITECTURE

BACKGROUND (1) Technical Field

This invention relates to electronic circuits, and more particularly to calibration and testing architectures for radio frequency integrated circuits.

(2) Background

Radio frequency (RF) integrated circuits (ICs) may include a number of different RF signal paths and involve multiple inputs and outputs, such as is the case with multi-antenna/multi-transceiver RF ICs. Such RF IC's may be used, for example, in communication or radar systems that utilize beamforming techniques for directional signal transmission and/or reception. Beamforming combines transmit/receive elements in a phased array in such a way that signals at particular angles experience constructive interference while other signals at other angles experience destructive interference. Beamforming can be used at both the transmitting and receiving ends of a communication system in order to achieve spatial selectivity. Another advantage of beamforming is that the directional nature of the link means that less power needs to be transmitted to achieve a good signal to noise ratio at the receiver because all of the signal energy is directed at the receiver rather than being dispersed omni-directionally.

The quality of beamforming depends on how accurately multiple transceivers on an IC track each other with respect to at least phase and attenuation. It is possible to adjust the settings of different transceiver phase shifters circuits and attenuators circuits if the performance of each transceiver is known in advance. Measured differences between transmitted and received signals may be used to adjust (calibrate) the phase and/or attenuation state of one transceiver with respect to the other transceiver. However, accurate calibration measurements of such performance are difficult to obtain in an assembled final system where all measurements need to be done "over the air", meaning actually transmitting a signal (which may be varied over a band of frequencies) from one transceiver through an antenna and receiving that signal in a different transceiver through an antenna. Such measurements require relatively elaborate testing equipment capable of dealing with high frequency RF signals (e.g., up to 30 GHz or more) and may be heavily influenced by environmental factors in the test set-up that alter, shield, attenuate, distort, or otherwise affect the transmitted and received signals. Furthermore, the accuracy or performance of a transceiver will vary over the possible bandwidth of the system, and therefore adjustments may need to be made dynamically depending on the instantaneous frequency of operation.

Accordingly, there is a need to be able to calibrate RF ICs used in multi-transceiver RF systems more accurately, preferably with a simpler testing environment. The present invention meets this need and more.

SUMMARY OF THE INVENTION

The invention encompasses a calibration architecture that enables accurate calibration of radio frequency (RF) integrated circuits (ICs) chips used in multi-transceiver RF systems in a relatively simple testing environment. Embodiments of the invention include one or more on-chip switchable cross-circuit calibration paths that enable direct coupling of a portion of the on-chip circuit to an RF test system while isolating other circuitry on the chip.

Advantages of various embodiments of the invention include a calibration architecture that enables accurate calibration of RF ICs used in multi-transceiver RF systems in a relatively simple testing environment that is done by direct connection (as opposed to "over the air") at significantly lower frequencies. Accordingly, environmental factors in the test set-up that alter, shield, attenuate, distort, or otherwise affect transmitted and received "over the air" test signals are eliminated or significantly mitigated. Further, periodic self-calibration of an RF IC in accordance with the present invention can be performed after initial factory calibration, so that adjustments in desired performance parameters can be made while such an IC is embedded within a final system, and thus take into account the actual usage environment (including, for example, temperature, electrically "noisy" circuitry, parasitic electromagnetic coupling, etc.). Periodic self-calibration also allows re-characterization of such an RF IC to take into account component degradation due to age or other factors.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION OF THE INVENTION

The invention encompasses a calibration architecture that enables accurate calibration of radio frequency (RF) integrated circuits (ICs) chips used in multi-transceiver RF systems in a relatively simple testing environment. Embodiments of the invention include one or more on-chip switchable cross-circuit calibration paths that enable direct coupling of a portion of the on-chip circuit to an RF test system while isolating other circuitry on the chip.

Figure 1A:
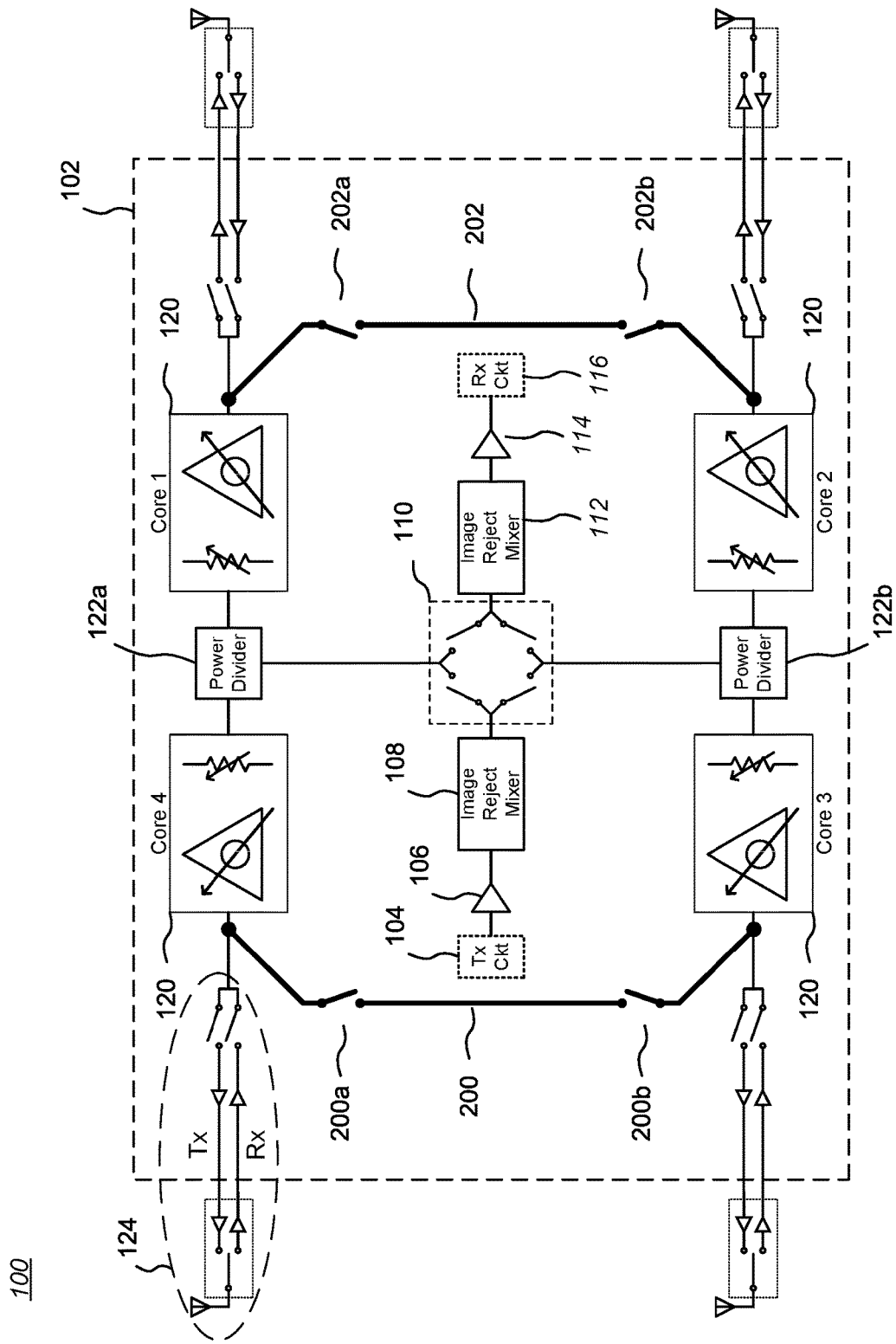
FIG. 1A is a block diagram of a first embodiment of an RF IC (or "chip") with integrated calibration circuitry suitable for use in a multi-transceiver RF system.

FIG. 1A is a block diagram 100 of a first embodiment of an RF IC 102 (or "chip") with integrated calibration circuitry suitable for use in a multi-transceiver RF system. This particular example of an RF IC 102 is configured to be coupled to transmit circuitry 104 (labeled "Tx Ckt") through an isolation and/or drive buffer 106 to a conventional image reject mixer 108, which in turn is coupled to a multi-way switch complex 110 (see also FIG. 1C). Also coupled to the multi-way switch complex 110 through a conventional image reject mixer 112 and an isolation and/or drive buffer 114 is receive circuitry 116 (labeled "Rx Ckt"). The transmit circuitry 104 and the receive circuitry 116 generally will operate at baseband frequencies, but in some embodiments may operate at intermediate (IF) or RF frequencies (with appropriate adjustments in other circuitry, such as the image reject mixers 108, 112, if needed).

The transmit circuitry 104 and/or the receive circuitry 116 may be on-chip, or optionally may be on off-chip, as suggested by the dotted boxes around both circuit blocks. Accordingly, in some configurations of the RF IC 102, the transmit circuitry 104, drive buffer 106, and image reject mixer 108 can be considered to define a primary RF transmission path, while in other configurations, the drive buffer 106 and image reject mixer 108 can be considered to define the primary RF transmission path. Similarly, in some configurations of the RF IC 102, the image reject mixer 112, buffer 114, and receive circuitry 116 can be considered to define a primary RF reception path, while in other configurations, the image reject mixer 112 and buffer 114 can be considered to define the primary RF reception path.

Figure 1B:
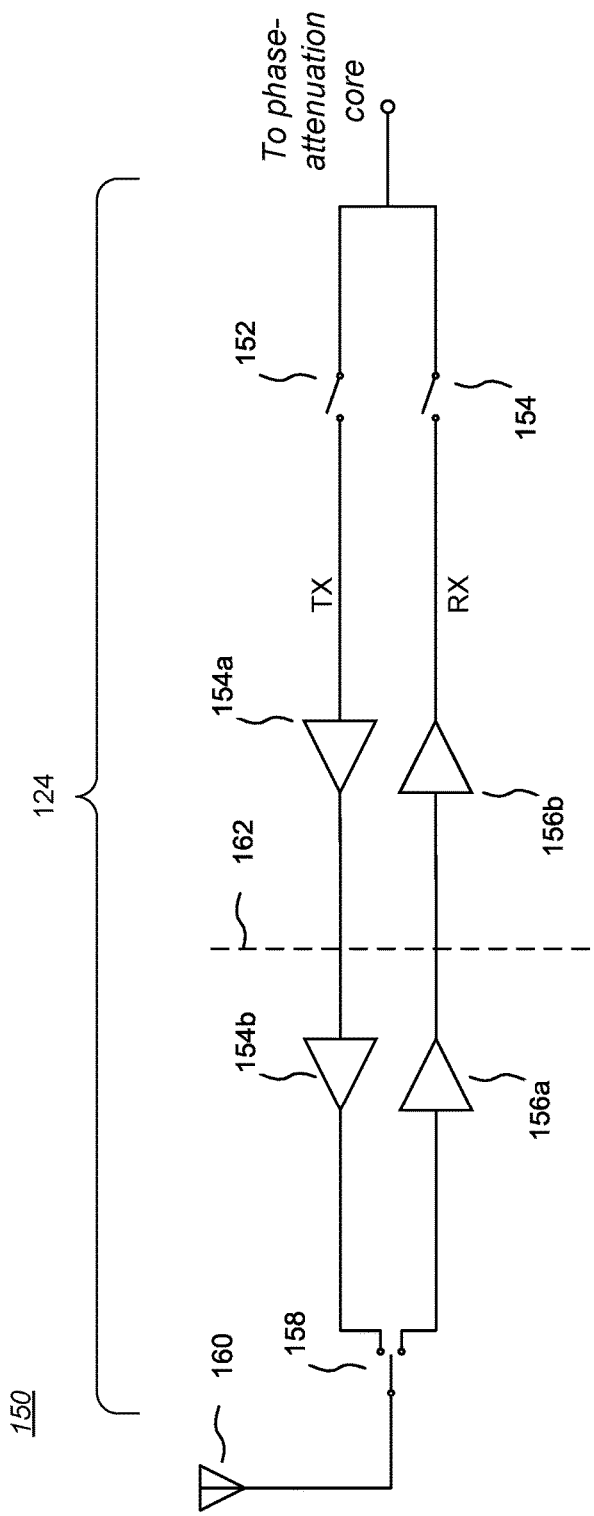
FIG. 1B is a block diagram of the input/output circuit of FIG. 1A.
Figure 1C:
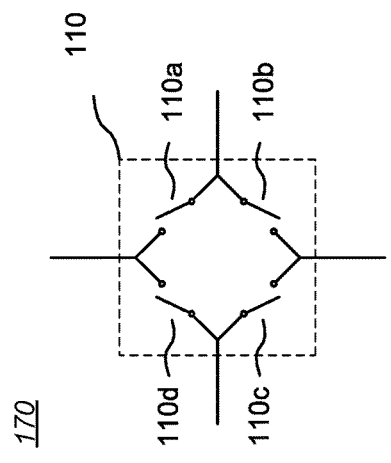
FIG. 1C is a block diagram of the multi-way switch complex of FIG. 1A.

In the illustrated example, the multi-way switch complex 110 allows selective coupling of either the transmit circuitry 104 or the receive circuitry 116 to one or more pairs of phase-attenuation cores 120 through a corresponding power divider 122a, 122b, which may be, for example, Wilkinson power dividers (see also FIG. 1C for more details of the multi-way switch complex 110). If needed for impedance matching, the multi-way switch complex 110 may be coupled to the power dividers 122a, 122b through a transmission line (not shown).

The four illustrated phase-attenuation cores 120 each include a phase shifter circuit and an attenuator circuit, one or both of which is adjustable or variable. More than or fewer than four phase-attenuation cores 120 may be included on the RF IC 102; in general, the number of phase-attenuation cores 120 may range from 1 to N, where N is limited only by practical IC fabrication constraints. Each phase-attenuation core 120 is shown connected to an associated input/output circuit 124 (to avoid clutter, only one input/output circuit 124—indicated by a dashed-line oval—is numbered). The combination of a phase-attenuation core 120 and an associated input/output circuit 124 comprises a transceiver front-end circuit.

FIG. 1B is a block diagram 150 of the input/output circuit 124 of FIG. 1A. In the illustrated example, a pair of single-pole, single-throw (SPST) switches 152, 154 may respectively select a transmit path TX or a receive path RX. The SPST switches 152, 154 may be implemented, for example, as one or more field effect transistors (FETs), or may be microelectromechanical system (MEMS) devices, and are preferably included on-chip. Further, in some embodiments, a single-pole, double-throw (SPDT) switch may be used in place of the SPST switches 152, 154, and in many cases would be preferred.

The transmit path TX includes one or more amplifiers 154a, 154b, which may be on-chip, off-chip, or a mix of on-chip and off-chip (FIG. 1A shows such a mix). One or more of the TX path amplifiers (e.g., amplifier 154a) may be an isolation and/or drive buffer amplifier (which may only have unity gain in some cases). At least one of the amplifiers 154a, 154b may be a power amplifier.

The receive path RX also includes one or more amplifiers 156a, 156b, which may be on-chip, off-chip, or a mix of on-chip and off-chip (again, FIG. 1A shows such a mix). One or more of the RX path amplifiers (e.g., amplifier 156b) may be an isolation and/or drive buffer amplifier (again, which may only have unity gain in some cases). At least one of the amplifiers 156a, 156b may be a low noise amplifier (LNA).

A single-pole, double-throw (SPDT) switch 158 selectively couples either the transmit path TX or the receive path RX to an antenna 160. The SPDT switch 158 may be implemented, for example, as one or more FETs or MEMS devices. In some embodiments, a pair of SPST switches (similar to SPST switches 152, 154) may be used in place of the SPDT switch 158.

In a typical configuration, as suggested by the dotted line 162, amplifier 154a is an on-chip buffer amplifier, amplifier 154b is an off-chip power amplifier, SPDT switch 158 is off-chip, amplifier 156a is an off-chip LNA, and amplifier 156b is an on-chip buffer amplifier (i.e., the gain may be 1). The state of the various switches 152, 154, 158 may be controlled by on-chip or off-chip control circuitry (not shown).

While some components shown in FIGS. 1A and 1B are illustrated as being external to the RF IC 102, in some embodiments, all of the elements shown as external to the RF IC 102 or optionally external to the RF IC 102 may be fully integrated onto a single IC die or onto a set of intercoupled IC dies placed inside or embedded within a single IC package. A fully integrated version is to a great extent desirable, since all circuitry on the same die would have similar gradients for process, voltage, and temperature (PVT) variations, and hence a calibration scheme would be simplified.

FIG. 1C is a block diagram 170 of the multi-way switch complex 110 of FIG. 1A, showing individually labeled switches 110a-110d, which may be implemented, for example, as one or more FETs or MEMS devices.

Referring back to FIG. 1A, by selectively controlling the multi-way switch complex 110 and the switches of one or more input/output circuits 124, a signal originating in the transmit circuitry 104 can be transmitted as an RF signal through one or more phase-attenuation cores 120 to one or more antennas 160 while isolating the receive circuitry 116. Similarly, an RF signal received at one or more antennas 160 can be conveyed through one or more phase-attenuation cores 120 to the receive circuitry 116 while isolating the transmit circuitry 104. In either case, the phase and/or attenuation of the RF signal may be modified by one or more of the phase-attenuation cores 120. It should be understood that FIG. 1A is simply one example of a multi-transceiver RF system, and that other configurations of multi-transceiver RF systems are within the scope of the invention as claimed below.

Referring back to FIG. 1A, in order to enable calibration of at least the phase-attenuation cores 120 of the RF IC 102, a set of switchable cross-circuit calibration ("C3") paths 200, 202 are formed on-chip and connected between pairs of phase-attenuation cores 120. As illustrated, C3 path 200 connects corresponding ports of Core 3 and Core 4, and C3 path 202 connects corresponding ports of Core 1 and Core 2.

In the illustrated embodiment, C3 path 200 includes two associated switches 200a, 200b, and similarly C3 path 202 includes two associated switches 202a, 202b. Such a configuration is useful in conjunction with the embodiment shown in FIG. 3 described below, but only one switch per C3 path need be used if on-chip calibration is limited to the phase-attenuation cores 120. The associated C3 path switches may be implemented, for example, as one or more FETs or MEMS devices.

Figure 2:
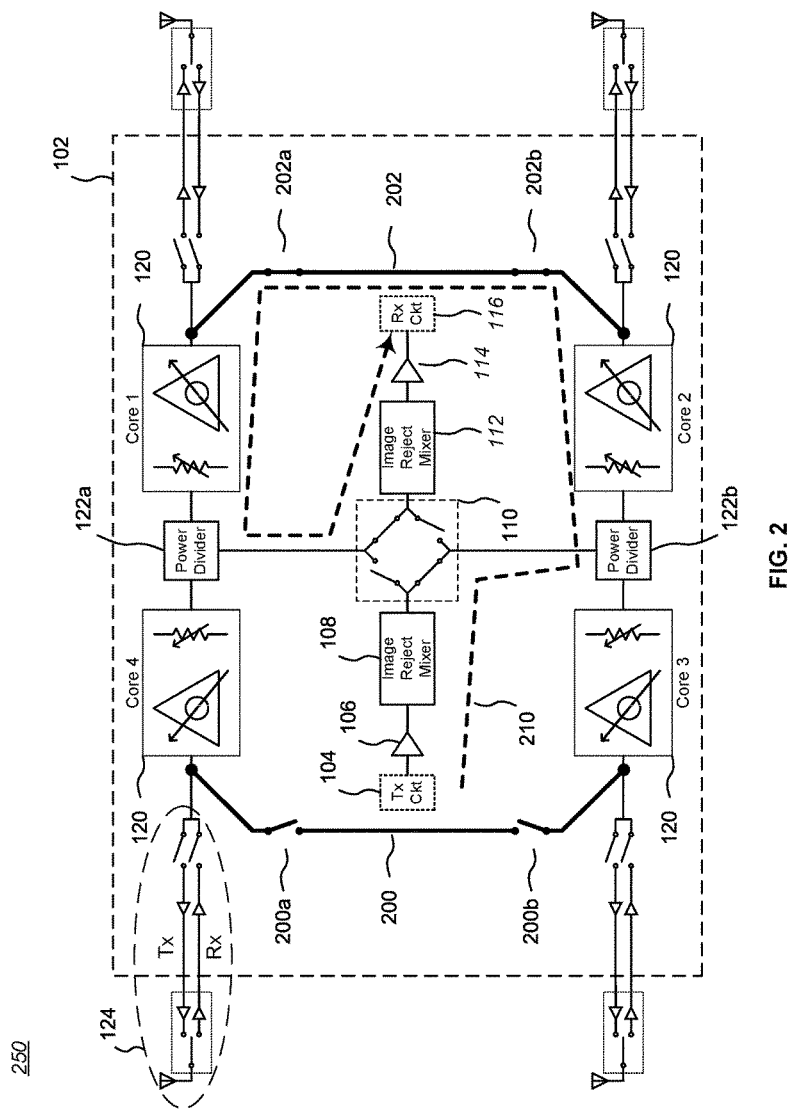
FIG. 2 is a block diagram showing a switch configuration for testing phase-attenuation Cores 1 and 2 of the RF IC of FIG. 1A.

FIG. 2 is a block diagram 250 showing a switch configuration for testing phase-attenuation Cores 1 and 2 of the RF IC of FIG. 1A. As illustrated, two of the switches (110a, 110c in FIG. 1C) of the multi-way switch complex 110 and the associated switches 202a, 202b of the C3 path 202 are closed, thus creating a signal path as indicated by the bold dashed line—that is, from the transmit circuitry 104 through the buffer 106, image reject mixer 108, one signal path of the multi-way switch complex 110, power divider 122b, Core 2, C3 path 202, Core 1, power divider 122a, back through a different signal path of the multi-way switch complex 110, and thence through image reject mixer 112 and buffer 116 to receive circuitry 116. All other illustrated switches are open. Thus, an RF signal from the transmit circuitry 104 can be conveyed internally through both Core 2 and Core 1 of the RF IC 102 to the receive circuitry 116.

In a preferred embodiment, to calibrate Core 1, applied control signals set Core 2 to have minimum attenuation and approximately zero phase shift to minimize any effect of Core 2 on an RF test signal. At the same time, applied control signals set Core 3 and Core 4 to have a maximum attenuation (high impedance), primarily to provide a good 50 ohm impedance for the power dividers 122a, 122b, and secondarily to reduce the impact of Core 3 and Core 4 on any measurements that may occur through RF coupling. While an RF test signal (which may be varied over a desired frequency range) is applied by the transmit circuitry 104 and/or by external test equipment, applied control signals "sweep" (vary) the attenuation and/or phase state settings of Core 1 over a range of possible nominal settings at each applied RF signal frequency. The actual effects on the internally conveyed RF signal of each nominal phase shift and attenuation state setting can be measured within the receive circuitry 116 and/or by external test equipment.

Similarly, in a preferred embodiment, to calibrate Core 2, applied control signals set Core 1 to have minimum attenuation and approximately zero phase shift, applied control signals optionally set Core 3 and Core 4 to have a maximum attenuation, and an RF test signal (which may be varied over a desired frequency range) is applied by the transmit circuitry 104 and/or by external test equipment. Applied control signals sweep the attenuation and/or phase state settings of Core 2 over a range of possible settings at each applied RF signal frequency. The resulting effects on the internally conveyed RF signal can be measured within the receive circuitry 116 and/or by external test equipment.

In both cases, the RF signal path is along the counter-clockwise bold dashed line 210 when characterizing the signal modification behavior of Core 2 or Core 1. Note that a "clockwise" version of the RF signal path that traverses through Core 1 first and Core 2 second can be achieved by reversing the illustrated switch states of the component switches of the multi-way switch complex 110. If desired, both the clockwise and counter-clockwise versions of the RF signal path may be characterized; this may be advantageous if the Core blocks and/or signal paths are asymmetric. For example, Core 1 may have more attenuation and phase shift range than Core 2, or the RF IC 102 may contain an odd number of Cores (e.g., 3, 5, or 7).

In a similar manner, Cores 3 and 4 can be characterized by closing the other two switches (110b, 110d in FIG. 1C) of the multi-way switch complex 110, closing the associated switches 200a, 200b of the C3 path 200, and opening all other illustrated switches, thus allowing an RF signal to be conveyed from the transmit circuitry 104 internally through Core 4 and then Core 3 of the RF IC 102 to the receive circuitry 116 (i.e., counter-clockwise). Alternatively, an RF signal can be conveyed clockwise from the transmit circuitry 104 internally through Core 3 and then Core 4 to the receive circuitry 116 by closing the associated switches 200a, 200b of the C3 path 200, but keeping the switch configuration of the multi-way switch complex 110 as shown in FIG. 2 and opening all other illustrated switches.

In tabular form, referring to the illustrated switches, an RF test signal based on a signal originating from the transmit circuitry 104 can be transmitted through any of the phase-attenuation cores 120 (Cores 1-4 in this case) to the receive circuitry 116 by opening (binary 0) or closing (binary 1) the switches as shown in TABLE 1:

TABLE 1

| | CORES TO TEST (order indicates direction of test signal) | | | |
|---|---|---|---|---|
| SWITCH | Core 2 Core 1 | Core 1 Core 2 | Core 3 Core 4 | Core 4 Core 3 |
| 110a | 1 | 0 | 1 | 0 |
| 110b | 0 | 1 | 0 | 1 |
| 110c | 1 | 0 | 1 | 0 |
| 110d | 0 | 1 | 0 | 1 |
| 200a | 0 | 0 | 1 | 1 |
| 200b | 0 | 0 | 1 | 1 |
| 202a | 1 | 1 | 0 | 0 |
| 202b | 1 | 1 | 0 | 0 |

Other calibration schemes may be used as well. For example, the testing scheme illustrated in FIG. 2 connects Cores 1 and 2 in series while essentially isolating Cores 3 and 4. In alternative testing schemes, it may be useful to serially connect more than two Cores, or to serially connect two or more Cores in sets while concurrently connecting two or more of such sets in parallel (some additional path switches may need to be added in some cases). For example, referring to FIG. 2, switches 200a, 200b of the C3 path 200 may be closed along with switches 202a, 202b of the C3 path 202, thus creating a first signal path from the transmit circuitry 104 through Cores 2 and 1 to the receive circuitry 116, and a parallel second signal path from the transmit circuitry 104 through Cores 3 and 4 to the receive circuitry 116. Such a parallel configuration allows characterization of the interaction of Cores 1 and 4 over their respective ranges of attenuation and phase shift while Cores 2 and 3 are set to minimum attenuation and approximately zero phase shift. Similarly, the interaction of Cores 2 and 3 can be characterized over their respective ranges of attenuation and phase shift while Cores 1 and 4 are set to minimum attenuation and approximately zero phase shift. In each case, the phase and/or attenuation settings for Cores being characterized may be varied in parallel across all such Cores, or one Core may be varied while one or more other Cores are in a set phase/attenuation condition. Such testing of parallel sets of series connected Cores may provide insight into the beam forming and path tapering characteristics of a particular multi-transceiver RF system embodied in or incorporating an RF IC 102.

Characterization of the phase-attenuation cores 120 (Cores 1-4) by mapping nominal phase and attenuation states to actual phase shift and attenuation levels may be sufficient for some calibration purposes. For example, a nominal attenuation level for Core 1 of 1.5 dB may result in a measured attenuation level of 1.4 dB. In some applications, simply knowing such discrepancies may by sufficient. In other cases, some designs for the phase-attenuation cores 120 provide for internal compensation of such discrepancies, so that the actual phase shift and attenuation levels more closely correspond to the nominal phase and attenuation states. Examples of a phase shifter circuit having extra circuitry for enabling such compensation capabilities may be found in U.S. patent application Ser. No. 14/988,463, filed Jan. 5, 2016, entitled Reflection-Based RF Phase Shifter and assigned to the assignee of the present invention, the teachings of which are hereby incorporated by reference. Similar considerations apply to adding and utilizing extra resistive elements for compensation purposes within the attenuator portion of a phase-attenuation core 120. In all cases, it is useful to characterize all of the phase-attenuation cores 120 (Cores 1-4 in the example of FIG. 2) to take into account possible variations between such cores, for example, due to process variations and differences in adjacent circuitry.

Figure 3:
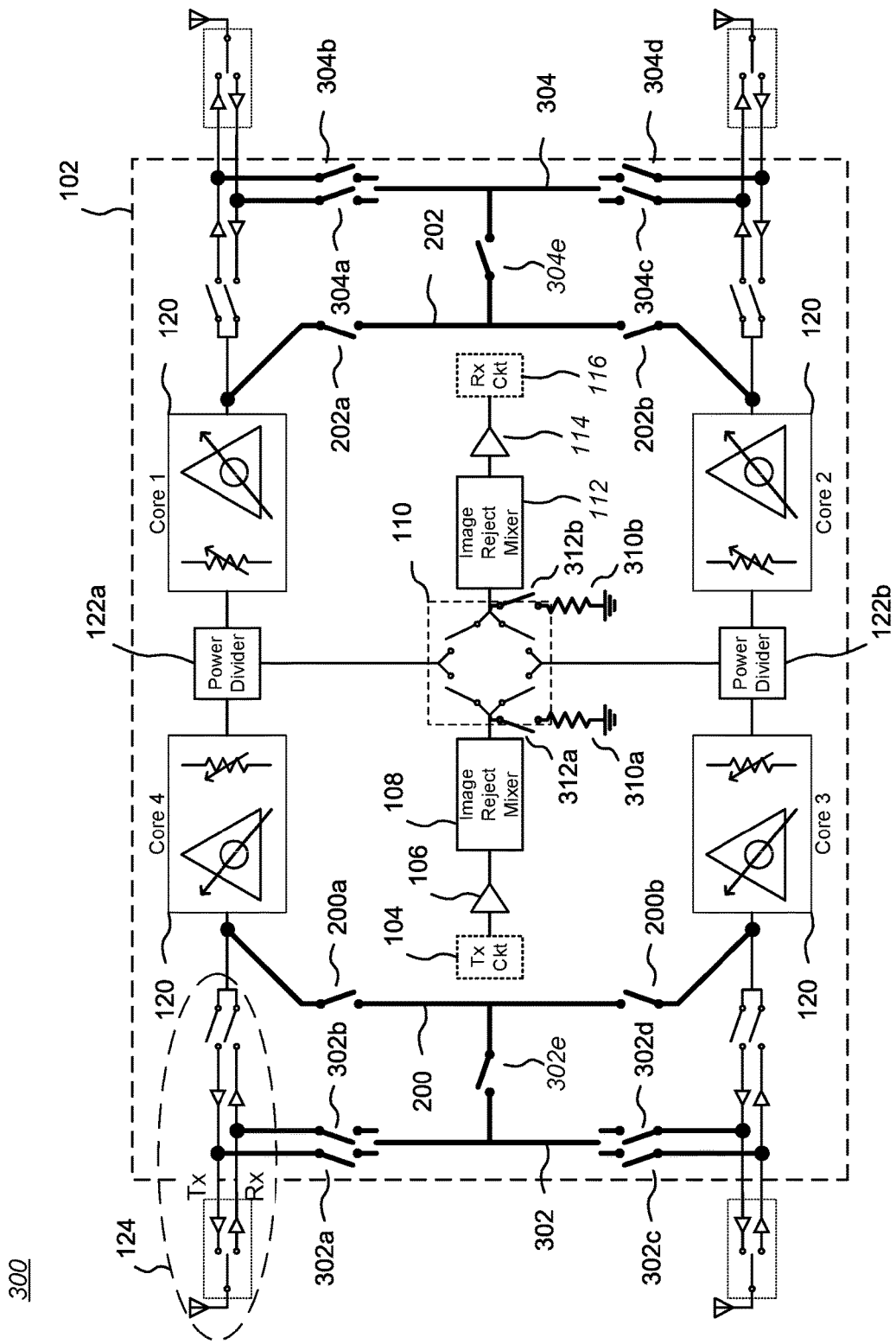
FIG. 3 is a block diagram of a second embodiment of an RF IC with integrated calibration circuitry suitable for use in a multi-transceiver RF system.

The concepts described above can be extended to include more circuitry that may affect an RF signal conveyed to or from the antennas 160. Thus, while the embodiment of FIG. 1A and FIG. 2 allows for characterization of the phase-attenuation cores 120, it is possible to extend testing to more peripheral circuitry in the RF IC 102, such as the on-chip amplifiers 154a, 156b (see FIG. 1B) in each associated input/output circuit 124. For example, FIG. 3 is a block diagram of a second embodiment of an RF IC with integrated calibration circuitry suitable for use in a multi-transceiver RF system. Formed on-chip with the circuit of FIG. 1A are sets of switchable periphery cross-circuit calibration ("PC3") paths 302, 304, each connected to the transmit path TX and the receive path RX of pairs of phase-attenuation cores 120 by associated switches 302a-302d, 304a-304d. (Note that the PC3 paths are essentially the same as C3 paths, differing only in the connection points and number of switches, and are re-named only for clarity in the following description.)

As illustrated, PC3 path 302 connects corresponding TX and RX paths of Core 3 and Core 4, and PC3 path 304 connects corresponding TX and RX paths of Core 1 and Core 2, at a point "between" corresponding on-chip amplifiers 154a, 156b (see FIG. 1B) and external circuit connections for the RF IC 102. Each PC3 path 302, 304 is also coupled by an associated link switch 302e, 304e to a corresponding C3 path 200, 202. The associated PC3 path and link switches may be implemented, for example, as one or more FETs or MEMS devices.

By setting the states of the switches 302a-302e, 304a-304e associated with the PC3 paths and the switches 200a-200b, 202a-202b of the C3 paths, an RF test signal from the transmit circuitry 104 can be transmitted through any of the phase-attenuation cores 120 (Cores 1-4 in this case), through either an associated output amplifier 154a or input amplifier 156b, and then to the receive circuitry 116. Accordingly, the characteristics of any one amplifier 154a, 156b in the chain of components can be determined.

For example, referring to FIG. 3, the influence of the output amplifier 154a for Core 2 can be characterized by closing switch 110c (see FIG. 1C), SPST switch 152 (see FIG. 1B), switch 304c, link switch 304e, switch 202a, and switch 110a, while opening all other illustrated switches. Similarly, the influence of the input amplifier 156b for Core 1 can be characterized by closing switch 110c, switch 202b, link switch 304e, switch 304a, SPST switch 154, and switch 110a, while opening all other illustrated switches.

Focusing on just Cores 1 and 2, at least the peripheral component test signal pathways shown in TABLE 2 can be achieved by opening (binary 0) or closing (binary 1) the specified switches (note that these are in addition to the available test pathways shown in TABLE 1). All other illustrated switches not shown in TABLE 2 should be open. A similar set of switch settings will apply to Cores 3 and 4, or to any other number of phase-attenuation cores 120.

TABLE 2

| | SIGNAL PATHS TO TEST | | | |
|---|---|---|---|---|
| SWITCH | Core 1 TX amp | Core 1 RX amp | Core 2 TX amp | Core 2 RX amp |
| 110a | 0 | 1 | 1 | 0 |
| 110b | 1 | 0 | 0 | 1 |
| 110c | 0 | 1 | 1 | 0 |
| 110d | 1 | 0 | 0 | 1 |
| 202a | 0 | 0 | 1 | 1 |
| 202b | 1 | 1 | 0 | 0 |
| 304a | 0 | 1 | 0 | 0 |
| 304b | 1 | 0 | 0 | 0 |
| 304c | 0 | 0 | 1 | 0 |
| 304d | 0 | 0 | 0 | 1 |
| 304e | 1 | 1 | 1 | 1 |
| Core 1 TX: 152 | 1 | 0 | 0 | 0 |
| Core 1 RX: 154 | 0 | 1 | 0 | 0 |
| Core 2 TX: 152 | 0 | 0 | 1 | 0 |
| Core 2 RX: 154 | 0 | 0 | 0 | 1 |

As in the case of characterizing the phase-attenuation cores 120, mapping nominal phase and attenuation states to actual phase shift and attenuation levels for each phase-attenuation core 120 as influenced by the associated amplifiers 154a, 154b may be sufficient for some calibration purposes. In other cases, some designs for the phase-attenuation cores 120 provide for internal compensation of such discrepancies, so that the actual phase shift and attenuation levels can be set to more closely correspond to the nominal phase and attenuation states.

In some testing configurations, impedance mismatches may occur due to asymmetric loading of the power dividers 122a, 122b as an RF test signal is routed to only one set of cores (e.g., Core 1 and Core 2) while other sets of cores (e.g., Core 3 and Core 4) are set to be in an essentially disconnected or isolated state. To counteract such mismatches, offsetting impedances 310a, 310b (shown as absorptive shunt resistors, by way of example) optionally may be coupled by associated switches 312a, 312b to the switch complex 110 at the ports coupled to the image reject mixers 108, 110. While only two such offsetting impedances 310a, 310b are shown (on the "bottom" side of the switch complex 110), for layout symmetry, it may be desirable to provide similar switched impedances on the "top" side of the switch complex 110. The associated switches may be implemented, for example, as one or more FETs or MEMS devices.

For an RF IC 102 for circuitry having a characteristic impedance of 50 ohms, the offsetting impedances 310a, 310b may be about 100 ohms each. In operation, when a calibration mode RF test path is created within the RF IC 102 through the C3 paths 200, 202 and/or the PC3 paths 302, 304, the switches 312a, 312b associated with the offsetting impedances 310a, 310b would be closed. In a normal, non-calibration operational mode, the switches 312a, 312b associated with the offsetting impedances 310a, 310b would be open.

Another optional circuit that may be included in embodiments of the invention is a switch that allows direct connection of the intermediate frequency (IF) portion of the end-to-end transmit circuitry 104 signal path to the IF portion of the receive circuitry 116. The IF portion of the end-to-end signal path is typically at a significantly lower frequency than the "over the air" transmitted and received signals for such a system. For example, while the "over the air" frequency may be around 30 GHz, the corresponding IF frequency may be about 3-4 GHz. Testing at IF frequencies has an advantage because less expensive testing equipment is required and influences (e.g., parasitic coupling) by the testing environment are lessened.

Figure 4:
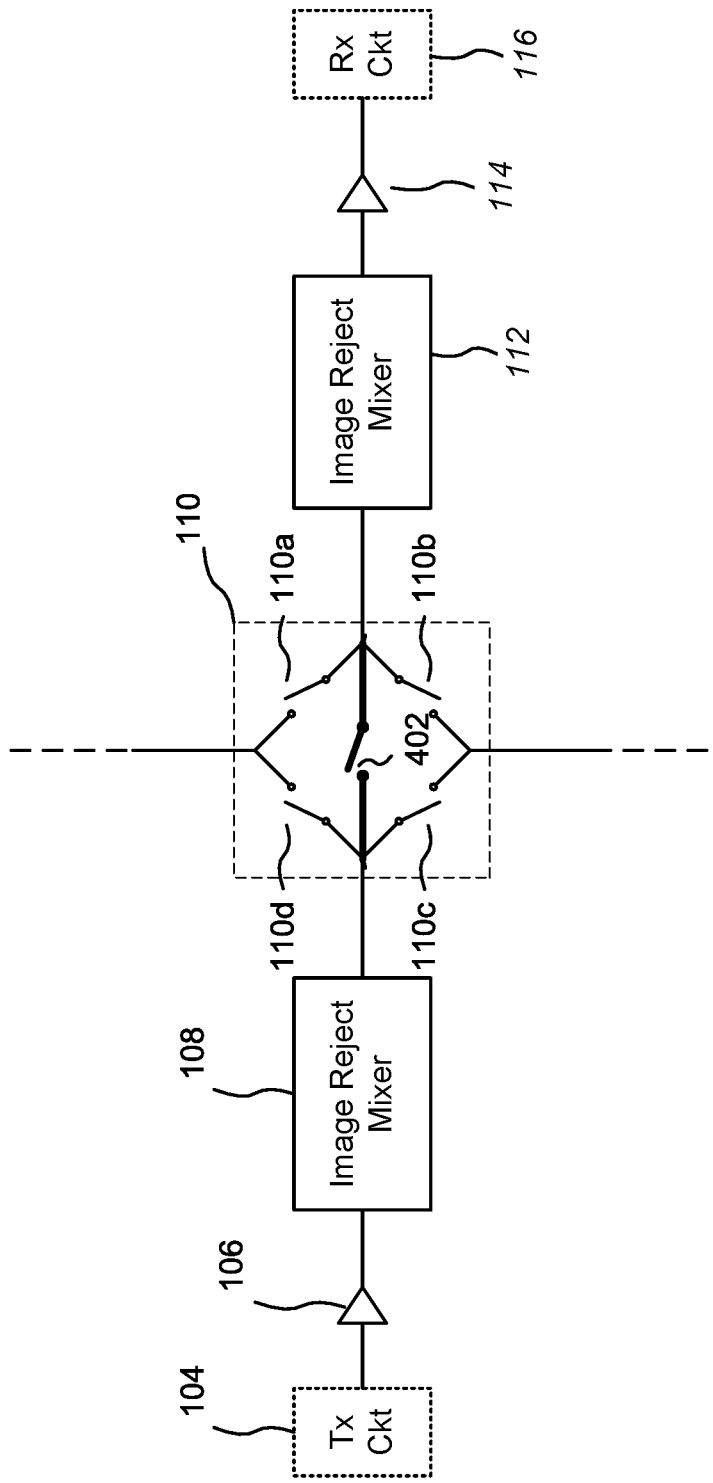
FIG. 4 is a block diagram of a portion of the circuitry of FIG. 1A or FIG. 3 showing an intermediate frequency path bypass switch.

FIG. 4 is a block diagram of a portion of the circuitry of FIG. 1A or FIG. 3 showing an intermediate frequency path bypass switch 402. As illustrated, the IF bypass switch 402 is coupled to the switch complex 110 between the ports coupled to the image reject mixers 108, 110. The IF bypass switch 402 may be implemented, for example, as one or more FETs or MEMS devices. In operation, by closing the IF bypass switch 402 while setting all of the switches 110a-110d of the switch complex 110 open, the IF portion of the transmit circuitry 104 signal path is directly coupled to the IF portion of the receive circuitry 116. Such a test configuration allows characterization of the end-to-end circuit path from the transmit circuitry 104 to the receive circuitry 116 without a minimum of influence from the other circuitry on the RF IC 102.

Further, using the IF bypass switch 402 to characterize the end-to-end IF circuit path alone may be useful to "de-embed" the IF path characteristics from the actual RF measurements that are needed for calibration of the Cores (i.e., essentially allowing the effects of the IF components to be subtracted from the RF measurements). This may be particularly important for frequency variation across the RF bandwidth of interest because such variation is a much larger proportion of the total bandwidth at the lower IF frequency than it is at the higher RF frequency—for example, a frequency sweep of 2 GHz centered at an IF frequency of 4 GHz will show much more performance variation than a frequency sweep of 2 GHz centered at an RF frequency of 28 GHz.

As noted above, more than or fewer than (but at least two) four transceiver front-end circuits (i.e., phase-attenuation cores 120 and associated input/output circuits 124) may be included on the RF IC 102. For two or four transceiver front-end circuits, the switchable cross-circuit calibration paths and switchable periphery cross-circuit calibration paths can be configured as shown in FIG. 1A and/or FIG. 3. For more than four transceiver front-end circuits on an RF IC 102, the switchable cross-circuit calibration paths, switchable periphery cross-circuit calibration paths, and various switch states can be configured in a variety of ways so long as each element of the transceiver front-end circuits to be tested (e.g., phase-attenuation cores 120 and/or on-chip amplifiers 154a, 156b) can be coupled to an RF test signal and measurement circuitry or devices in relative isolation from other elements of the RF IC 102.

Note that one usage of the inventive concepts is periodic self-calibration of an RF IC 102 by characterizing the performance of the various phase-attenuation core circuits, periphery amplifier circuits, and the circuit components within the end-to-end IF signal path, and then adjusting one or more of such circuits to tune for one or more desired performance parameters (e.g., bandwidth, insertion loss, linearity, etc.). It is thus possible to apply a pseudo closed-loop calibration mechanism from time to time.

Thus, embodiments of the invention include one or more on-chip switchable cross-circuit calibration paths that enable direct coupling of a portion of the on-chip circuit to an RF test system while isolating other circuitry on the chip.

Advantages of various embodiments of the invention include a calibration architecture that enables accurate calibration of RF ICs used in multi-transceiver RF systems in a relatively simple testing environment that is done by direct connection (as opposed to "over the air") at significantly lower frequencies. Accordingly, environmental factors in the test set-up that alter, shield, attenuate, distort, or otherwise affect transmitted and received "over the air" test signals are eliminated or significantly mitigated. Further, periodic self-calibration of an RF IC in accordance with the present invention can be performed after initial factory calibration, so that adjustments in desired performance parameters can be made while such an IC is embedded within a final system, and thus take into account the actual usage environment (including, for example, temperature, electrically "noisy" circuitry, parasitic electromagnetic coupling, etc.). Periodic self-calibration also allows re-characterization of such an RF IC to take into account component degradation due to age or other factors.

It should also be noted that while the above description and accompanying figures are directed to a multi-transceiver RF system configured for a time division duplex (TDD) communication protocol, the same concepts may be applied to a multi-transceiver RF system configured for a frequency division duplex (FDD) communication protocol or for other types of communication protocols employing one or more transceivers.

Methods

Figure 5:
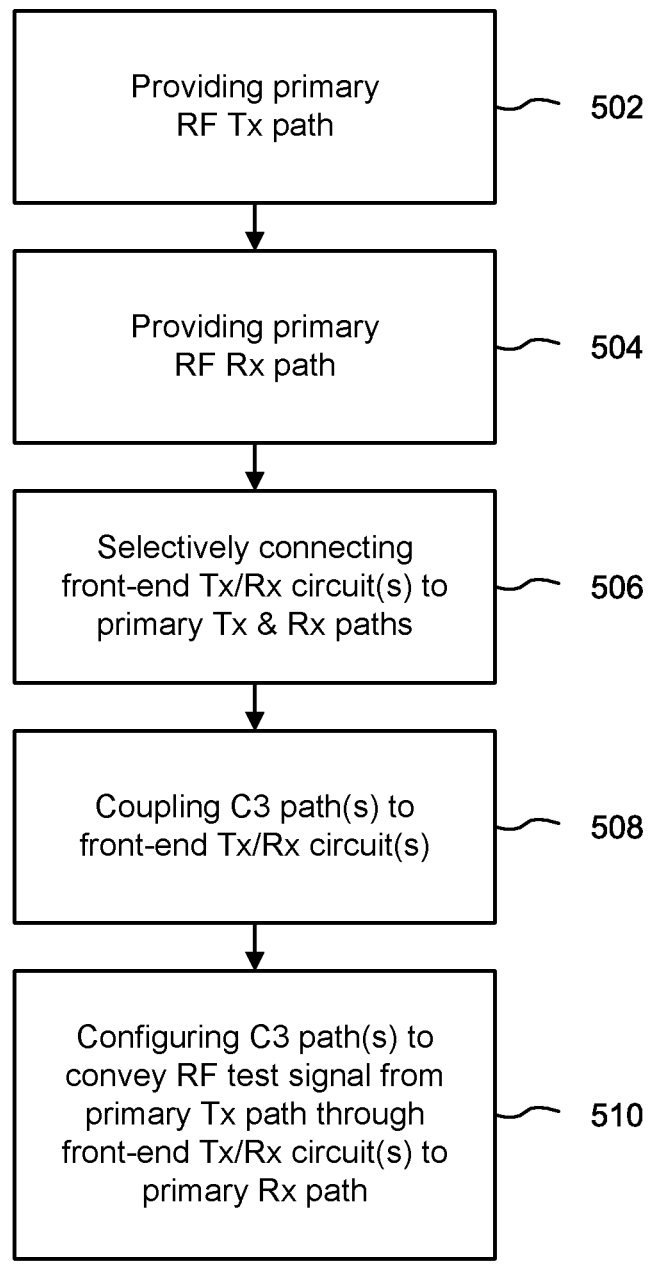
FIG. 5 is a flowchart showing a first method for calibrating a radio frequency (RF) integrated circuit.

Another aspect of the invention includes methods for calibrating a radio frequency (RF) integrated circuit. FIG. 5 is a flowchart 500 showing a first method for calibrating a radio frequency (RF) integrated circuit, including: providing a primary RF transmission path (STEP 502); providing a primary RF reception path (STEP 504); selectively connecting at least one RF transceiver front-end circuit to the primary RF transmission path and the primary RF reception path (STEP 506); coupling at least one switchable cross-circuit calibration (C3) path to the at least one RF transceiver front-end circuit (STEP 508); and configuring the at least one switchable cross-circuit calibration path to convey, in a calibration mode, an RF test signal from the primary RF transmission path through the coupled at least one RF transceiver front-end circuit to the primary RF reception path (STEP 510).

Other aspects of the above method include—minimizing the effects on the RF test signal of all but one of the coupled at least one RF transceiver front-end circuit so as to relatively isolate any remaining coupled RF transceiver front-end circuits; at least one RF transceiver front-end circuit being a phase-attenuation core; each RF transceiver front-end circuit being a phase-attenuation core; at least one RF transceiver front-end circuit being an input/output circuit; each RF transceiver front-end circuit being an input/output circuit; providing an intermediate frequency path bypass switch coupled between the primary RF transmission path and the primary RF reception path, and selectively coupling the RF test signal from the primary RF transmission path to the primary RF reception path; and providing one or more offsetting impedances selectably connectable to at least one of the primary RF transmission path or primary RF reception path, and connecting the one or more offsetting impedances to at least one of the primary RF transmission path or primary RF reception path during the calibration mode.

Yet another aspect of the invention includes a method for calibrating a radio frequency (RF) integrated circuit, including: providing a primary RF transmission path; providing a primary RF reception path; providing at least two RF transceiver front-end circuits each selectively connectable to the primary RF transmission path and the primary RF reception path, each RF transceiver front-end circuit including a phase-attenuation core and an associated input/output circuit; providing at least one switchable cross-circuit calibration path coupled to the at least two RF transceiver front-end circuits; configuring the at least one switchable cross-circuit calibration path to convey, in a calibration mode, an RF test signal from the primary RF transmission path through at least a portion of the coupled at least two RF transceiver front-end circuits to the primary RF reception path; and during the calibration mode, minimizing the effects on the RF test signal of all but one of the coupled at least two RF transceiver front-end circuits so as to relatively isolate the remaining coupled RF transceiver front-end circuit.

Other aspects of the above method include: providing an intermediate frequency path bypass switch coupled between the primary RF transmission path and the primary RF reception path, and selectively coupling the RF test signal from the primary RF transmission path to the primary RF reception path; providing one or more offsetting impedances selectably connectable to at least one of the primary RF transmission path or primary RF reception path, and connecting the one or more offsetting impedances to at least one of the primary RF transmission path or primary RF reception path during the calibration mode; and providing at least a first and a second switchable cross-circuit calibration paths, the at least first switchable cross-circuit calibration path being selectively connectable to the phase-attenuation cores of each of the at least two RF transceiver front-end circuits, and the at least second switchable cross-circuit calibration path being selectively connectable to the associated input/output circuit of each of the at least two RF transceiver front-end circuits.

Fabrication Technologies and Options

The term "MOSFET" technically refers to metal-oxide-semiconductors; a synonym for MOSFET is "MISFET", for metal-insulator-semiconductor FET. However, "MOSFET" has become a common label for most types of insulated-gate FETs ("IGFETs"). Despite that, it is well known that the term "metal" in the names MOSFET and MISFET is now often a misnomer because the previously metal gate material is now often a layer of polysilicon (polycrystalline silicon). Similarly, the "oxide" in the name MOSFET can be a misnomer, as different dielectric materials are used with the aim of obtaining strong channels with smaller applied voltages. Accordingly, the term "MOSFET" as used herein is not to be read as literally limited to metal-oxide-semiconductors, but instead includes IGFETs in general.

As should be readily apparent to one of ordinary skill in the art, various embodiments of the invention can be implemented to meet a wide variety of specifications. Unless otherwise noted above, selection of suitable component values is a matter of design choice and various embodiments of the invention may be implemented in any suitable IC technology (including but not limited to MOSFET and IGFET structures), or in hybrid or discrete circuit forms. Integrated circuit embodiments may be fabricated using any suitable substrates and processes, including but not limited to standard bulk silicon, silicon-on-insulator (SOI), silicon-on-sapphire (SOS), GaN HEMT, GaAs pHEMT, and MESFET technologies. However, the inventive concepts described above are particularly useful with an SOI-based fabrication process (including SOS), and with fabrication processes having similar characteristics. Fabrication in CMOS on SOI or SOS enables low power consumption, good isolation in the non-conducting OFF state to avoid leakage of signals into other circuitry, the ability to withstand high power signals during operation due to FET stacking, good linearity, and high frequency operation (in excess of about 10 GHz, and particularly above about 20 GHz). Monolithic IC implementation is particularly useful since parasitic capacitances generally can be kept low (or at a minimum, kept uniform across all units, permitting them to be compensated) by careful design.

Voltage levels may be adjusted or voltage and/or logic signal polarities reversed depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functional without significantly altering the functionality of the disclosed circuits.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion. It is to be understood that the foregoing description is intended to illustrate and not to limit the scope of the invention, which is defined by the scope of the following claims, and that other embodiments are within the scope of the claims. (Note that the parenthetical labels for claim elements are for ease of referring to such elements, and do not in themselves indicate a particular required ordering or enumeration of elements; further, such labels may be reused in dependent claims as references to additional elements without being regarding as starting a conflicting labeling sequence).

What is claimed is:

1. A radio frequency (RF) integrated circuit including:
   (a) a primary RF transmission path;
   (b) a primary RF reception path;
   (c) at least one RF transceiver front-end circuit, each selectively connectable to the primary RF transmission path and the primary RF reception path; and
   (d) at least one switchable cross-circuit calibration path coupled to the at least one RF transceiver front-end circuit and configured to convey, in a calibration mode, an RF test signal from the primary RF transmission path through the coupled at least one RF transceiver front-end circuit to the primary RF reception path;
   wherein the effects on the RF test signal of all but one of the coupled at least one RF transceiver front-end circuit are minimized so as to relatively isolate any remaining coupled RF transceiver front-end circuits.

2. The invention of claim 1, wherein at least one RF transceiver front-end circuit includes a phase-attenuation core.

3. The invention of claim 1, wherein each RF transceiver front-end circuit includes a phase-attenuation core.

4. The invention of claim 1, wherein at least one RF transceiver front-end circuit includes an input/output circuit.

5. The invention of claim 1, wherein each RF transceiver front-end circuit includes an input/output circuit.

6. The invention of claim 1, further including an intermediate frequency path bypass switch coupled between the primary RF transmission path and the primary RF reception path, for selectively coupling the RF test signal from the primary RF transmission path to the primary RF reception path.

7. The invention of claim 1, further including one or more offsetting impedances selectably connectable to at least one of the primary RF transmission path or primary RF reception path.

8. A radio frequency (RF) integrated circuit including:
(a) a primary RF transmission path;
(b) a primary RF reception path;
(c) at least two RF transceiver front-end circuits each selectively connectable to the primary RF transmission path and the primary RF reception path, each RF transceiver front-end circuit including a phase-attenuation core and an associated input/output circuit; and
(d) at least one switchable cross-circuit calibration path coupled to the at least two RF transceiver front-end circuits and configured to convey, in a calibration mode, an RF test signal from the primary RF transmission path through at least a portion of the coupled at least two RF transceiver front-end circuits to the primary RF reception path;
wherein the effects on the RF test signal of all but one of the coupled at least two RF transceiver front-end circuits are minimized so as to relatively isolate the remaining coupled RF transceiver front-end circuit.

9. The invention of claim 8, further including an intermediate frequency path bypass switch coupled between the primary RF transmission path and the primary RF reception path, for selectively coupling the RF test signal from the primary RF transmission path to the primary RF reception path.

10. The invention of claim 8, further including one or more offsetting impedances selectably connectable to at least one of the primary RF transmission path or primary RF reception path.

11. The invention of claim 8, further including at least a first and a second switchable cross-circuit calibration paths, the at least first switchable cross-circuit calibration path being selectively connectable to the phase-attenuation cores of each of the at least two RF transceiver front-end circuits, and the at least second switchable cross-circuit calibration path being selectively connectable to the associated input/output circuit of each of the at least two RF transceiver front-end circuits.

12. A method for calibrating a radio frequency (RF) integrated circuit, including:
(a) providing a primary RF transmission path;
(b) providing a primary RF reception path;
(c) selectively connecting at least one RF transceiver front-end circuit to the primary RF transmission path and the primary RF reception path;
(d) coupling at least one switchable cross-circuit calibration path to the at least one RF transceiver front-end circuit;
(e) configuring the at least one switchable cross-circuit calibration path to convey, in a calibration mode, an RF test signal from the primary RF transmission path through the coupled at least one RF transceiver front-end circuit to the primary RF reception path; and
(f) minimizing the effects on the RF test signal of all but one of the coupled at least one RF transceiver front-end circuit so as to relatively isolate any remaining coupled RF transceiver front-end circuits.

13. The method of claim 12, wherein at least one RF transceiver front-end circuit includes a phase-attenuation core.

14. The method of claim 12, wherein each RF transceiver front-end circuit includes a phase-attenuation core.

15. The method of claim 12, wherein at least one RF transceiver front-end circuit includes an input/output circuit.

16. The method of claim 12, wherein each RF transceiver front-end circuit includes an input/output circuit.

17. The method of claim 12, further including:
(a) providing an intermediate frequency path bypass switch coupled between the primary RF transmission path and the primary RF reception path; and
(b) selectively coupling the RF test signal from the primary RF transmission path to the primary RF reception path.

18. The method of claim 12, further including:
(a) providing one or more offsetting impedances selectably connectable to at least one of the primary RF transmission path or primary RF reception path; and
(b) connecting the one or more offsetting impedances to at least one of the primary RF transmission path or primary RF reception path during the calibration mode.

19. A method for calibrating a radio frequency (RF) integrated circuit, including:
(a) providing a primary RF transmission path;
(b) providing a primary RF reception path;
(c) providing at least two RF transceiver front-end circuits each selectively connectable to the primary RF transmission path and the primary RF reception path, each RF transceiver front-end circuit including a phase-attenuation core and an associated input/output circuit;
(d) providing at least one switchable cross-circuit calibration path coupled to the at least two RF transceiver front-end circuits;
(e) configuring the at least one switchable cross-circuit calibration path to convey, in a calibration mode, an RF test signal from the primary RF transmission path through at least a portion of the coupled at least two RF transceiver front-end circuits to the primary RF reception path; and
(f) during the calibration mode, minimizing the effects on the RF test signal of all but one of the coupled at least two RF transceiver front-end circuits so as to relatively isolate the remaining coupled RF transceiver front-end circuit.

20. The method of claim 19, further including:
(a) providing an intermediate frequency path bypass switch coupled between the primary RF transmission path and the primary RF reception path; and
(b) selectively coupling the RF test signal from the primary RF transmission path to the primary RF reception path.

21. The method of claim 19, further including:
(a) providing one or more offsetting impedances selectably connectable to at least one of the primary RF transmission path or primary RF reception path; and
(b) connecting the one or more offsetting impedances to at least one of the primary RF transmission path or primary RF reception path during the calibration mode.

22. The method of claim 19, further including providing at least a first and a second switchable cross-circuit calibration paths, the at least first switchable cross-circuit calibration path being selectively connectable to the phase-attenuation cores of each of the at least two RF transceiver front-end circuits, and the at least second switchable cross-circuit calibration path being selectively connectable to the associated input/output circuit of each of the at least two RF transceiver front-end circuits.

\* \* \* \* \*